E. E. WALKER.
BEAN SEPARATING MACHINE.
APPLICATION FILED FEB. 21, 1913.
1,099,778.
Patented June 9, 1914.
2 SHEETS—SHEET 1.
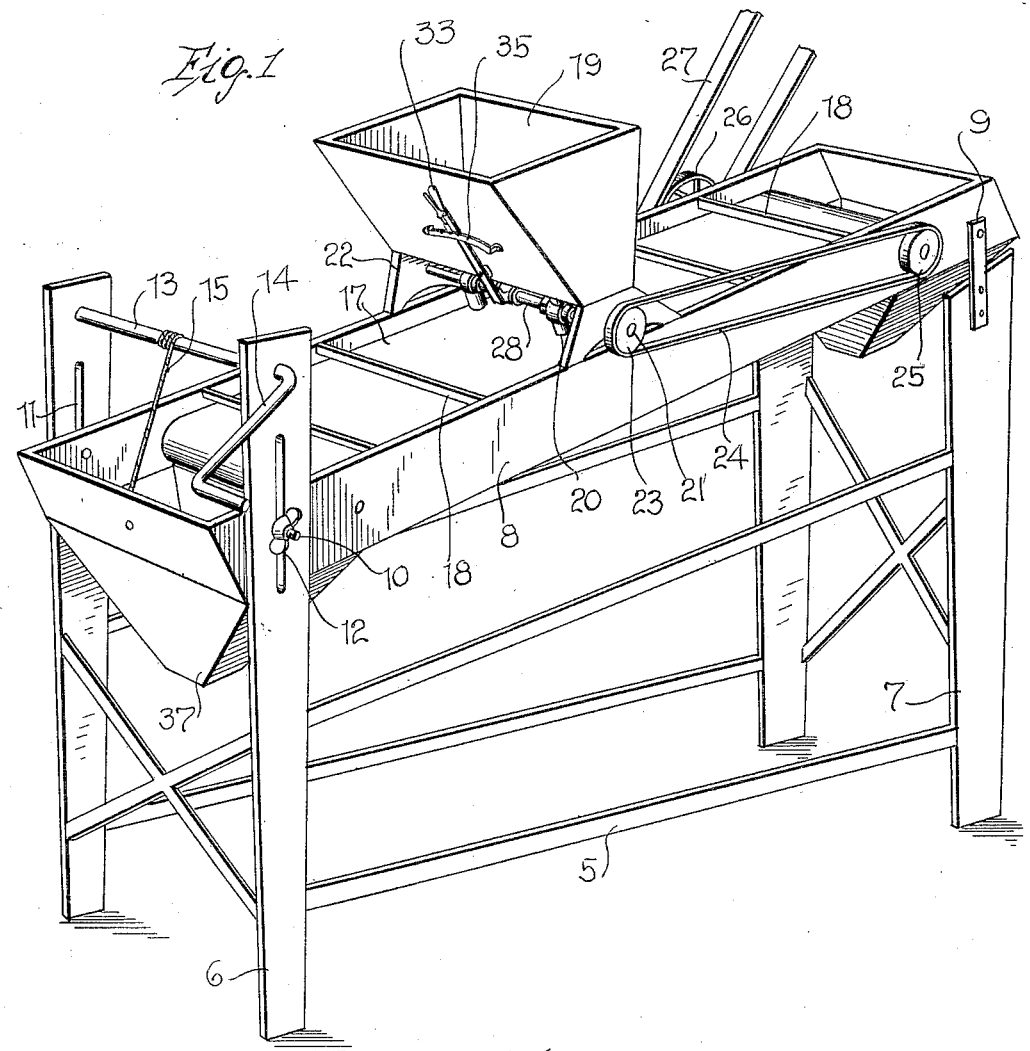
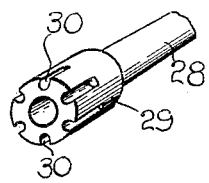
Inventor
EDWIN E. WALKER
Witnesses
Robert M. Sutphen
A. J. Hind
By Watson E. Coleman
Attorney E. E. WALKER.
BEAN SEPARATING MACHINE.
APPLICATION FILED FEB. 21, 1913.
1,099,778.
Patented June 9, 1914.
2 SHEETS—SHEET 2.
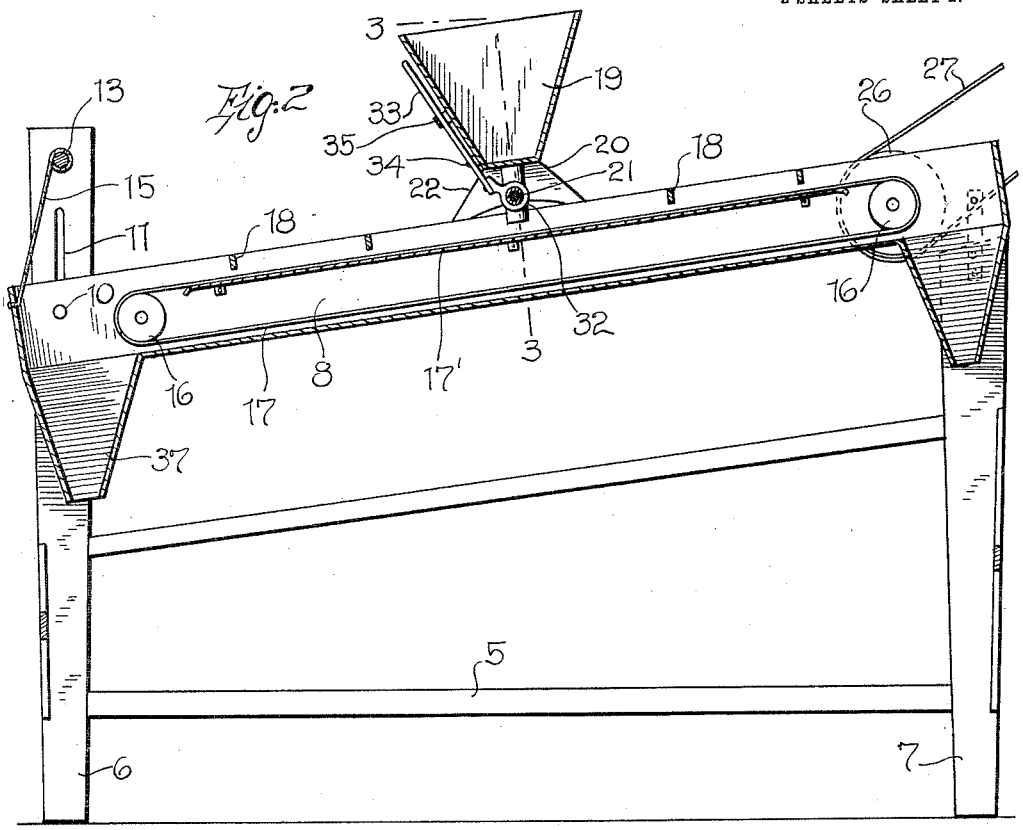
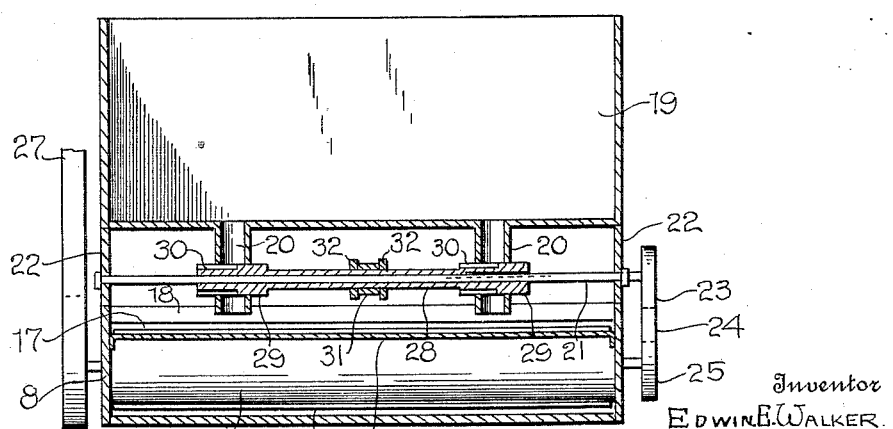
Witnesses
Robert M. Sutphen.
A. I. Hind.
Inventor
Edwin E. Walker.
By Watson E. Coleman
Attorney

UNITED STATES PATENT OFFICE.

EDWIN E. WALKER, OF OAKLEY, MICHIGAN.

BEAN-SEPARATING MACHINE.

1,099,778.    Specification of Letters Patent.    Patented June 9, 1914.

Application filed February 21, 1913. Serial No. 749,968.

*To all whom it may concern:*

Be it known that I, EDWIN E. WALKER, a citizen of the United States, residing at Oakley, in the county of Saginaw and State of Michigan, have invented certain new and useful Improvements in Bean-Separating Machines, of which the following is a specification, reference being had to the accompanying drawings.

This invention relates to an improved bean separating machine and has for its object to provide simple, efficient and durable mechanism for separating the inferior beans from the good beans.

Another object of the invention is to provide an adjustable endless apron, a hopper mounted above the apron to feed the beans thereto, and improved means for regulating the feed of the beans to the apron.

Another and more specific object of the invention is to provide a pan or trough fulcrumed at one end, means for vertically adjusting said trough at its other end to vary the inclination thereof, an endless apron mounted in said trough, a hopper arranged upon the trough to feed beans to the apron, and spaced transverse slats extending over the upper stretch of the apron to separate the good beans from those of inferior quality.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which Figure 1 is a perspective view of a bean separating machine embodying the present invention. Fig. 2 is a longitudinal section thereof; Fig. 3 is an enlarged transverse section taken on the line 3—3 of Fig. 2; Fig. 4 is a detail perspective view of one end of the sliding sleeve showing one of the feeding drums.

Referring in detail to the drawings, 5 designates a suitable frame structure which includes the spaced pairs of uprights 6 and 7 respectively. A shallow longitudinal pan or trough 8 is fulcrumed at one of its ends between the supporting brackets 9 mounted upon the upper ends of the rear uprights 7. To the side walls of this trough at its opposite ends, suitable bolts 10 are secured, said bolts moving vertically in the slots 11 provided in the uprights 6. Wing nuts 12 are threaded upon the ends of these bolts whereby the lower end of the trough 8 may be securely clamped in its adjusted position. The ends of a transverse shaft 13 are journaled in the uprights 6 and to one end of this shaft a crank handle 14 is connected whereby the shaft may be rotated. A rope or other flexible connection 15 has one of its ends attached to the shaft 13 and is adapted to be wound thereon. The other end of this rope is connected to the lower end of the trough 8.

Apron rollers 16 are arranged in the opposite ends of the trough and are provided with trunnions upon their ends which are journaled in the longitudinal side walls of said trough. An endless apron 17 of felt or other flexible material traverses these rollers. To the upper edges of the side walls of the trough, the ends of the transverse slats 18 are suitably secured. These slats are arranged in pairs upon opposite sides of the longitudinal center of the trough and have their lower edges spaced from the upper stretch of the apron 17, beneath which a supporting plate 17' is arranged. Upon the trough 8 at its approximate center, a suitable hopper 19 is mounted. From openings provided in the bottom of this hopper, the spouts 20 depend and are adapted to discharge the beans from the hopper upon the upper stretch of the apron. A transverse shaft 21 is journaled at its ends in suitable hanger bearings 22 secured to the bottom of the hopper at opposite ends thereof and upon one end of this shaft, a belt wheel 23 is fixed. This wheel is traversed by a driving belt 24 which extends around a similar wheel 25 fixed to one of the trunnions of the upper apron roller 16. A belt wheel or plate 26 is secured to the trunnion on the opposite end of this roller and is engaged by the power belt 27 extending from any suitable source of power.

Upon the shaft 21 between the discharge spouts 20 a sleeve 28 is keyed. This sleeve at its ends is diametrically enlarged to provide feeding drums 29 which are disposed for rotation in openings provided in the feed spouts 20. Each of the drums 29 is provided with a series of longitudinally extending corrugations 30 which are adapted to receive the beans and discharge the same from the lower open ends of the spouts in the rotation of the shaft 21. Upon the central portion of the sleeve 28, a collar 31 is loosely mounted, said collar being disposed between the fixed spaced collars 32 on said sleeve. To the collar 31, the lower end of a lever 33 is connected. This lever is fulcrumed intermediate of its ends as indicated at 34, and is provided with a spring pressed dog for engagement with the teeth of a rack 35 mounted upon one of the side walls of the hopper 19. It will be obvious that by simply shifting this lever in either direction, the extent of the longitudinal corrugations in the drums 29 which receive the beans may be varied so that a greater or less amount of the beans may be fed from the hopper to the upper stretch of the movable apron 17.

From the above description, the operation of the machine will be clearly and fully understood. The upper stretch of the apron 17 moves in the direction indicated by the arrow in Fig. 2 and after the drums 29 have been properly adjusted so as to feed the desired amount of beans to the apron, it will be obvious that the beans are continuously fed from the hopper to the apron at opposite sides of its transverse center. The good beans will gravitate downwardly upon the upper stretch of the apron while those of inferior quality will adhere to the surface of the apron and be carried with the same to the upper end of the trough 8 and discharged into a depending spout 36 provided thereon. The inferior beans are generally dry and comparatively small so that they will readily pass beneath the lower edges of the transverse slats 18. These slats, however, will obviate liability of the good beans being carried upwardly in the movement of the apron. At the lower end of the trough 8, a second spout 37 is provided from which the good beans gravitate and are discharged therefrom into a suitable receptacle. It is apparent that by simply loosening the nuts 12 on the ends of the bolts 10 the lower end of the trough may be vertically adjusted between the uprights 6 and the inclination of the trough varied to cause the beans of good quality to properly gravitate to the lower end thereof.

It will be seen from the above that I have produced a bean separating machine which is simple in its construction, highly efficient in practical use and may be manufactured at comparatively small cost.

It is obvious that the invention is susceptible of considerable modification in the form, proportion and arrangement of the several elements and I reserve the right to resort to such modifications as may be deemed desirable in putting the invention into practical use.

Having thus described the invention, what is claimed is:

A device of the character described including a frame having spaced standards adjacent its opposite ends, standards adjacent one end of the frame being provided with elongated slots extended longitudinally thereof, brackets carried by and projecting above the standards adjacent the opposite end of the frame, a trough pivotally supported between the brackets and being provided with laterally directed members extending through the slots of the first mentioned standards, a shaft mounted in such first mentioned standards above the walls thereof and being provided with an operating member, a flexible connection between said shaft and the adjacent end portion of the trough whereby said trough may be adjusted about its fulcrum upon proper rotation of the shaft, and means carried by the lateral projections of the trough and coacting with the adjacent standards for clamping the trough in its adjusted position.

In testimony whereof I hereunto affix my signature in the presence of two witnesses.

EDWIN E. WALKER.

Witnesses:
LEMUEL BLISS,
HARRY COY.

---

Copies of this patent may be obtained for five cents each, by addressing the "Commissioner of Patents, Washington, D. C."